United States Patent
Neyman

(10) Patent No.: US 9,054,587 B2
(45) Date of Patent: Jun. 9, 2015

(54) NON-ISOLATED AC-TO-DC CONVERTER HAVING A LOW CHARGING CURRENT INITIAL POWER UP MODE

(71) Applicant: IXYS Corporation, Milpitas, CA (US)

(72) Inventor: Leonid A. Neyman, Sunnyvale, CA (US)

(73) Assignee: IXYS Corporation, Milpitas, CA (US)

( * ) Notice: Subject to any disclaimer, the term of this patent is extended or adjusted under 35 U.S.C. 154(b) by 0 days.

(21) Appl. No.: 14/152,989

(22) Filed: Jan. 10, 2014

(65) Prior Publication Data
US 2014/0126258 A1    May 8, 2014

Related U.S. Application Data

(63) Continuation-in-part of application No. 13/569,458, filed on Aug. 8, 2012.

(51) Int. Cl.
*H02J 7/00* (2006.01)
*H02M 7/217* (2006.01)
*H02M 1/00* (2006.01)

(52) U.S. Cl.
CPC .... *H02M 7/2176* (2013.01); *H02M 2001/0006* (2013.01)

(58) Field of Classification Search
USPC .......................... 320/286, 285, 282, 284, 351
See application file for complete search history.

(56) References Cited

U.S. PATENT DOCUMENTS

| | | | | |
|---|---|---|---|---|
| 5,469,046 A | * | 11/1995 | Wong et al. | 323/286 |
| 5,483,142 A | * | 1/1996 | Skibinski et al. | 320/166 |
| 5,646,514 A | * | 7/1997 | Tsunetsugu | 323/288 |
| 2008/0144341 A1 | * | 6/2008 | Cook | 363/53 |
| 2010/0270982 A1 | * | 10/2010 | Hausman et al. | 320/166 |
| 2014/0062427 A1 | * | 3/2014 | Coleman et al. | 323/233 |

* cited by examiner

*Primary Examiner* — Brian Ngo
(74) *Attorney, Agent, or Firm* — Imperium Patent Works; Amir V. Adibi

(57) ABSTRACT

In a steady state operation mode, a charging circuit of a non-isolated AC-to-DC converter decouples an output voltage $V_O$ node from a $V_R$ node when the rectifier output signal $V_R$ on the $V_R$ node is greater than a first predetermined voltage $V_P$ and, 2) supplies a charging current from the $V_R$ node and onto the $V_O$ node when $V_R$ is less than $V_P$ provided that an output voltage $V_O$ on the $V_O$ node is less than a second predetermined voltage $V_{O(MAX)}$ and provided that $V_R$ is greater than $V_O$. In an initial power up operation mode, the maximum limit value of the charging current is smaller than it is during steady state operation. Due to the reduced charging currents employed during initial power up operation, less noise is injected back to the AC source and EMI filters are not required between the rectifier of the converter and the AC source.

20 Claims, 13 Drawing Sheets

HIGH-EFFICIENCY, LOW POWER, POWER SUPPLY CIRCUIT

LINEAR POWER SUPPLY

SWITCHING POWER SUPPLY

HIGH-EFFICIENCY, LOW POWER, POWER SUPPLY CIRCUIT

| EFFICIENCY | ~90% |
|---|---|
| SUPPLY CURRENT OUTPUT ($I_O$) | 20mA |
| SUPPLY VOLTAGE OUTPUT ($V_O$) | 3.3V |
| SUPPLY VOLTAGE OUTPUT RIPPLE | 3.3V-3.0V |

ALTERNATE EMBODIMENT IN WHICH COMPARATOR 33
IS POWERED FROM THE $V_O$ NODE

POWER ON OF THE POWER SUPPLY
CIRCUIT OF FIGURE 11

NON-ISOLATED AC-TO-DC CONVERTER HAVING A LOW CHARGING CURRENT INITIAL POWER UP MODE

CROSS REFERENCE TO RELATED APPLICATION

This application is a continuation-in-part of, and claims the benefit under 35 U.S.C. §120 from, nonprovisional U.S. patent application Ser. No. 13/569,458, entitled "High-Efficiency, Low-Power Power Supply Circuit," filed on Aug. 8, 2012. This application incorporates by reference U.S. patent application Ser. No. 13/569,458.

TECHNICAL FIELD

The described embodiments relate to power supply circuits suitable for supplying small amounts of power in an efficient manner.

BACKGROUND INFORMATION

Multiple types of power supplies exist that can be used to supply a small amount of supply power to an individual integrated circuit. One type of integrated circuit that sometimes needs to be powered is a microcontroller integrated circuit. A typical microcontroller integrated circuit might require only about ten milliamperes of supply current at a low supply voltage of 3.3 volts. A way to provide this small amount of power to the microcontroller integrated circuit at a low cost without wasting a lot of power is desired.

FIG. 1 (Prior Art) is a diagram of a first type power supply circuit 1 usable for this purpose. Power supply circuit 1 is called a linear regulator. A bridge rectifier 2 converts an AC input voltage from a source 15 into a rectified signal $V_R$ on node 3. If, for example, the AC input voltage is 120 VAC 60 Hz ordinary wall power, then the peak of the rectified signal $V_R$ across capacitor 4 may be about +169 volts. If, for example, the AC input voltage is 240 VAC 50 Hz wall power, then the peak of the rectified signal $V_R$ across capacitor 4 is about +338 volts. If only ten milliamperes at 3.3 volts is needed to supply power to the microcontroller 5, then the linear regulator is quite inefficient. Considering the 240 VAC situation, the voltage drop across the linear regulator 6 is approximately 338 volts minus 3.3 volts. At an average current flow of ten milliamperes, approximately 3.3 watts of power is dissipated by linear regulator 6. The power needed is only 33 mW (10 mA multiplied by 3.3 volts). Efficiency of the power supply is therefore about 33 mW/3.3 W, or 0.1 percent efficiency.

FIG. 2 (Prior Art) is a simplified diagram of a second type of power supply circuit 8 usable for the purpose of supplying power to microcontroller 5. The power supply circuit 8 is a flyback converter. The flyback converter 8 is about 80 to 85 percent efficient when in normal steady state operation, but the flyback converter 8 has several problems. First, the flyback converter 8 has relatively expensive and large components such as transformer 9 and output voltage sense circuitry 10-14. Second, the control circuitry 16 and the output voltage sense circuitry 10-14 of the flyback converter 8 must be powered. During initial start up of the flyback converter 8, before the auxiliary winding 17 can supply power to the control circuitry, power is supplied to the control circuitry 16 via resistor 18. Supplying power from the high rectified voltage $V_R$ on node 19 through this resistor 18 to a lower supply voltage used to power the control circuitry 16 is inefficient. Efficiency of the switching power supply during initial startup is similar to that of the linear regulator described above.

In some applications, the overall circuit being powered is powered up, and powered down, frequently. When the circuit is in a powered down condition, the flyback converter is not powered and is not switching. Next, the overall circuit is to power up and operate for a short period in a normal operating mode. The switching power supply therefore is powered up, and operates in an initial start up mode until it is operating in regulation, at which point the switching power supply starts operating in its normal operating mode. After only a brief amount of time in normal operating mode operation, the overall circuit is powered down again. The switching power supply is therefore powered down along with the other parts of the overall circuit. Because the period of normal mode operation is so short as compared to the amount of time the switching power supply spends in its initial start up mode, the efficiency of the switching power supply is undesirably low.

SUMMARY

In a first novel aspect, a power supply circuit includes a bridge rectifier, a charging circuit, and a storage capacitor. An AC signal (for example, 120 VAC 60 Hz) is received onto two nodes of the bridge rectifier. The bridge rectifier outputs a rectified signal $V_R$ onto a $V_R$ node and a GND node. In the case of the AC signal being a sinusoidal 120 VAC 60 Hz voltage signal, $V_R$ may be a full wave rectified signal having a maximum voltage of about +169 volts. The storage capacitor is coupled between an output voltage $V_O$ node and the GND node. The charging circuit keeps the $V_R$ node decoupled from the $V_O$ node (so that no charging current flows to the $V_O$ node) if $V_R$ is higher than a predetermined first voltage $V_P$. If $V_R$ is below the first predetermined voltage, then the charging circuit supplies a substantially constant charging current $I_{CHARGE}$ from the $V_R$ node, through the charging circuit, to the $V_O$ node, and to the storage capacitor, provided that: 1) the voltage $V_O$ on the storage capacitor is below a second predetermined voltage $V_{O(MAX)}$, and 2) $V_R$ is adequately higher than $V_O$. In one specific example, $V_R$ is adequately higher than $V_O$ if $V_R$ is 1.5 volts higher than $V_O$. Due to the flow of the charging current, the voltage $V_O$ on the storage capacitor increases up to the desired output voltage $V_{O(MAX)}$. The voltage $V_O$ on the storage capacitor decreases between times of charging, but the amount of decrease in $V_O$ is predetermined to be an acceptable amount for the circuit being driven. In one specific example, $V_O$ ripples from a maximum value $V_{O(MAX)}$ of 3.3 volts to a minimum value $V_{O(MIN)}$ of 3.0 volts.

Efficiency of the power supply circuit is high because the storage capacitor is only charged at times when $V_R$ is only slightly higher than the voltage $V_O$ on the storage capacitor. At other times when $V_R$ is much higher than $V_O$ there is no charging current flowing.

In one example, the charging circuit includes a switch (for example, a depletion mode n-channel field effect transistor) and a voltage detector circuit. When the depletion mode n-channel field effect transistor (dep-FET) is conductive, a charging current may flow from the $V_R$ node, through the dep-FET, to the $V_O$ node, and into the storage capacitor. The voltage detector circuit monitors $V_R$ on the $V_R$ node. If $V_R$ is detected to be greater than the first predetermined voltage $V_P$, then the voltage detector circuit increases the $V_{GS}$ of the dep-FET so that the dep-FET is off and remains off. In this way, the voltage detector keeps the charging circuit from conducting a charging current at all times when $V_R$ is large.

If, however, $V_R$ is determined to be less than the first predetermined voltage $V_P$, then the voltage detector circuit does not disable the dep-FET. Provided that the output voltage $V_O$ on the storage capacitor is below $V_{O(MAX)}$, and provided that $V_R$ is adequately higher than $V_O$, a substantially constant charging current $I_{CHARGE}$ is made to flow from the $V_R$ node, through the dep-FET, to the $V_O$ node, and to the storage capacitor. Such pulses of the substantially constant charging current $I_{CHARGE}$ serve to restore the voltage $V_O$ on the storage capacitor to its desired $V_{O(MAX)}$ value.

The power supply circuit can be realized in discrete form, or may be realized in integrated circuit form. In one example, the bridge rectifier and the charging circuit are realized in integrated circuit form. The resulting integrated circuit is packaged along with another integrated circuit and a storage capacitor in an integrated circuit package. The power supply circuit supplies power to the other integrated circuit (for example, a microcontroller integrated circuit) and also provides an amount of supply current for use by external off-chip circuits. The package may have a $V_O$ terminal and a GND terminal to which an external storage capacitor is coupled. The amount of supply current for use by external off-chip circuits can be taken from the $V_O$ terminal or from a lead of the external storage capacitor.

In a second novel aspect, the charging circuit varies the maximum value of the charging current $I_{CHARGE}$ as a function of the output voltage $V_O$. In one embodiment, the charging current is controlled to have a second maximum value $I_{MAX2}$ during initial power up of the power supply circuit and is controlled to have a first maximum value $I_{MAX1}$ during subsequent steady state operation of the power supply circuit, where $I_{MAX2}$ is smaller than $I_{MAX1}$. Using reduced magnitude charging current pulses during initial power up of the power supply circuit serves to reduce noise injected by the power supply circuit back onto AC supply voltage conductors when an output capacitor of the power supply circuit still has a low voltage. Once the voltage on the output capacitor is adequately high, the maximum of the charging current pulses is increased to the larger $I_{MAX1}$ value. In one advantageous aspect, there are no EMI filter components disposed between the rectifier of the power supply circuit and the AC supply voltage conductors through which the rectifier of the power supply circuit receives power from an AC voltage source.

Further details and embodiments and techniques are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention. It is to be understood that the waveforms in the drawings are idealized waveforms presented for illustrative purposes. The idealized waveforms are inaccurate in certain minor respects. More accurate waveforms can be determined by using the well known circuit simulator SPICE (using an accurate depletion mode FET model) to simulate the actual power supply circuit of interest and/or by fabricating the actual circuit and then testing it.

DETAILED DESCRIPTION

Reference will now be made in detail to embodiments of the invention, examples of which are illustrated in the accompanying drawings.

Figure 3:
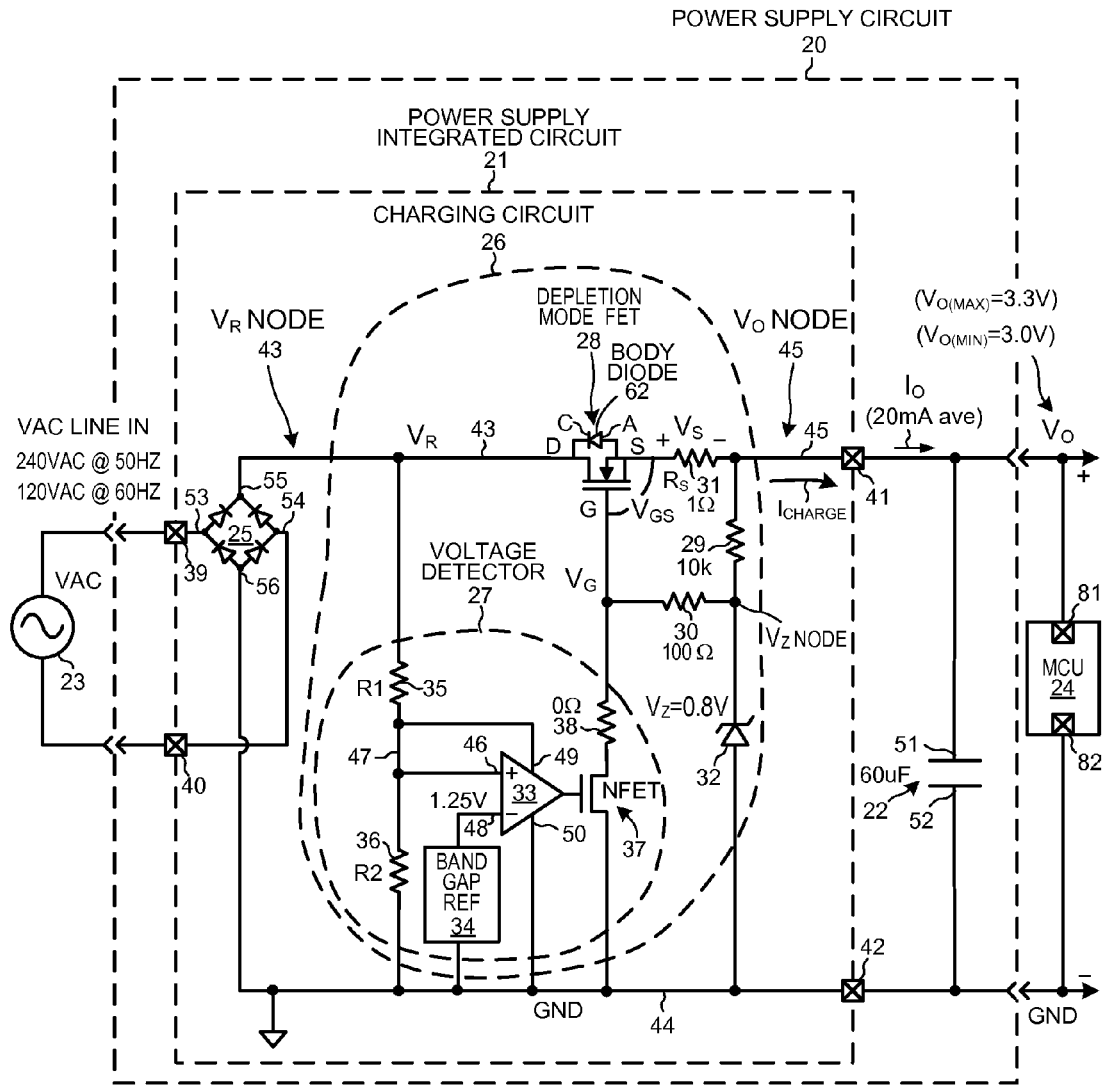
FIG. 3 is a circuit diagram of a high-efficiency, low-power, power supply circuit 20 in accordance with one novel aspect.

FIG. 3 is a circuit diagram of a high-efficiency, low-power, power supply circuit 20 in accordance with one novel aspect. Power supply circuit 20 includes a power supply integrated circuit 21 and a storage capacitor 22. The power supply circuit 20 receives sinusoidal AC wall power from an AC power source 23 and supplies twenty milliamperes of 3.3 volt DC supply current $I_O$ to a load, such as for example a microcontroller integrated circuit 24. In one example, AC power source 23 is 120 VAC 60 Hz power such as is typically available from a wall socket in a home in the United States. In another example, the AC power source 23 is 240 VAC 50 Hz power such as is typically available from a wall socket in European countries.

Power supply integrated circuit 21 includes a bridge rectifier 25 and a charging circuit 26. Charging circuit 26 in turn includes a voltage detector circuit 27, a depletion mode n-channel field effect transistor (dep-FET) 28, three resistors 29-31, and a zener diode 32. Voltage detector circuit 27 includes a comparator 33, a reference voltage generating circuit 34, a voltage divider involving resistors 35 and 36, an N-channel field effect transistor (NFET) 37, and an optional resistor 38. The bridge rectifier 25 and the charging circuit 26 are packaged together in a semiconductor package such as an ordinary injection molded package. The package has terminals 39-42. AC power is received onto integrated circuit 21 from AC power source 23 via terminals 39 and 40. Terminal 39 is coupled to lead or node 53 of bridge rectifier 25. Terminal 40 is coupled to lead or node 54 of bridge rectifier 25.

Charging current is supplied from integrated circuit 21 to capacitor 22 via terminal 41 to capacitor lead 51, and via terminal 42 to capacitor lead 52.

In the present example, power supply circuit 20 is to supply an average of twenty milliamperes of supply output current $I_O$ at 3.3 volts, where the supply voltage $V_O$ between terminals 41 and 42 is to vary by not more than ten percent. The output voltage $V_O$ output by the power supply circuit 20 therefore has a maximum value $V_{O(MAX)}$ of 3.3 volts and has a minimum value $V_{O(MIN)}$ of 3.0 volts. In the present example, AC power source 23 supplies a sinusoidal 120 VAC RMS voltage signal at 60 Hz. Bridge rectifier 25 receives the 120 VAC RMS sinusoidal 60 Hz voltage signal via terminals 39 and 40 and outputs a full wave rectified signal $V_R$ onto node $V_R$ 43. Node 44 is a ground node. Lead 55 of bridge rectifier 25 is coupled to and is a part of $V_R$ node 43. Lead 56 of bridge rectifier 25 is coupled to, and is a part of, GND node 44. The full wave rectified signal $V_R$ has a minimum value $V_{R(MIN)}$ of approximately 3.15 volts (as is explained in further detail below) and has a maximum value $V_{R(MAX)}$ of about +169 volts.

Voltage detector circuit 27 detects when $V_R$ is above a first predetermined voltage $V_P$, and when $V_R$ is detected to be above $V_P$ then the voltage detector circuit 27 disables charging circuit 26 so that the $V_O$ node 45 is decoupled from the $V_R$ node 43. When charging circuit 26 is disabled in this way, charging current does not flow from the $V_R$ node, through the charging circuit 26, through the $V_O$ node, and to the storage capacitor 22. The magnitude of the first predetermined voltage $V_P$ is determined by the ratio of the resistances R1/R2 of the voltage divider 35 and 36.

In the specific example of FIG. 3, the first predetermined voltage $V_P$ is 4.8 volts. The non-inverting input lead 46 of comparator 33 is coupled to node 47 whereas the inverting input lead 48 of comparator 33 is coupled to receive a 1.25 volt reference voltage from reference voltage generator 34. The supply voltage lead 49 of comparator 33 is coupled to node 47 whereas the ground lead 50 of comparator 33 is coupled to ground node 44. If voltage $V_R$ on $V_R$ node 43 is higher than the first predetermined voltage $V_P$, then the voltage on node 47 is greater than 1.25 volts, and comparator 33 drives the voltage on the gate of NFET 37 high. NFET 37 is turned on. NFET 37 becomes conductive and pulls the voltage on the gate of dep-FET 28 down. As a result, the gate-to-source voltage $V_{GS}$ of dep-FET 28 exceeds the 2.5 volt $V_{GS(OFF)}$ of dep-FET 28, and dep-FET 28 is turned off. No charging current therefore can flow from $V_R$ node 43, through dep-FET 28, to $V_O$ node 45, and into capacitor 22. Dep-FET 28 remains off as long as $V_R$ is above the first predetermined voltage $V_P$ of 4.8 volts.

If, however, $V_R$ drops below the first predetermined voltage $V_P$, then NFET 37 is turned off. Provided that $V_O$ on node 45 is lower than a second predetermined voltage $V_{O(MAX)}$ and provided that $V_R$ on node 43 is adequately higher than $V_O$ on node 45, charging circuit 26 supplies a substantially constant charging current ($I_{CHARGE}$) from the $V_R$ node 43 and onto $V_O$ node 45 and to storage capacitor 22. In the present example, storage capacitor 22 has a capacitance of sixty microfarads. If storage capacitor 22 is not fully charged and the voltage $V_O$ on storage capacitor 22 is less than $V_{O(MAX)}$, then the charging current $I_{CHARGE}$ will flow to the storage capacitor to increase the voltage on the storage capacitor. If storage capacitor 22 is fully charged to the desired $V_{O(MAX)}$ voltage (in the present example, 3.3 volts), then the $V_O$ voltage on $V_O$ node 45 is not lower than the second predetermined voltage $V_{O(MAX)}$ and no charging current flows. The magnitude of the second predetermined voltage $V_{O(MAX)}$ is determined by the zener voltage of zener diode 32.

In the specific example of FIG. 3, the second predetermined voltage $V_{O(MAX)}$ is 3.3 volts and $V_{GS(OFF)}$ of dep-FET 28 is 2.5 volts. In the present example, dep-FET 28 is an IXTA6N50D2 depletion-mode field effect transistor available from IXYS Corporation of 1590 Buckeye Drive, Milpitas, Calif. 95035. The zener voltage $V_Z$ of zener diode 32 is therefore 0.8 volts. With NFET 37 being off, the voltage on the gate of dep-FET 28 is fixed at 0.8 volts due to the zener diode. As current flows through the dep-FET, the magnitude of the voltage drop $V_S$ across $R_S$ resistor 31 increases. ($V_S$ here is the voltage drop across $R_S$ resistor 31, not the absolute voltage on the source of dep-FET 28). The increase in voltage $V_S$ serves to increase $V_{GS}$ of the dep-FET 28. Increasing $V_{GS}$ causes the internal resistance of the dep-FET to increase, thereby decreasing current flow through dep-FET. Due to the voltage drop $V_S$ across $R_S$ resistor 31, and due to the gate voltage on dep-FET 28 being fixed by zener diode 32, current flow through dep-FET 28 remains substantially constant. This substantially constant charging current $I_{CHARGE}$ charges storage capacitor 22.

If after a period of charging the voltage $V_O$ reaches 3.3 volts, then the source voltage on dep-FET 28 is large enough with respect to the gate voltage as set by zener diode 32 that dep-FET 28 is turned off. The second predetermined voltage $V_{O(MAX)}$ is equal to the sum of $V_Z$ and $V_{GS(OFF)}$.

Figure 4:
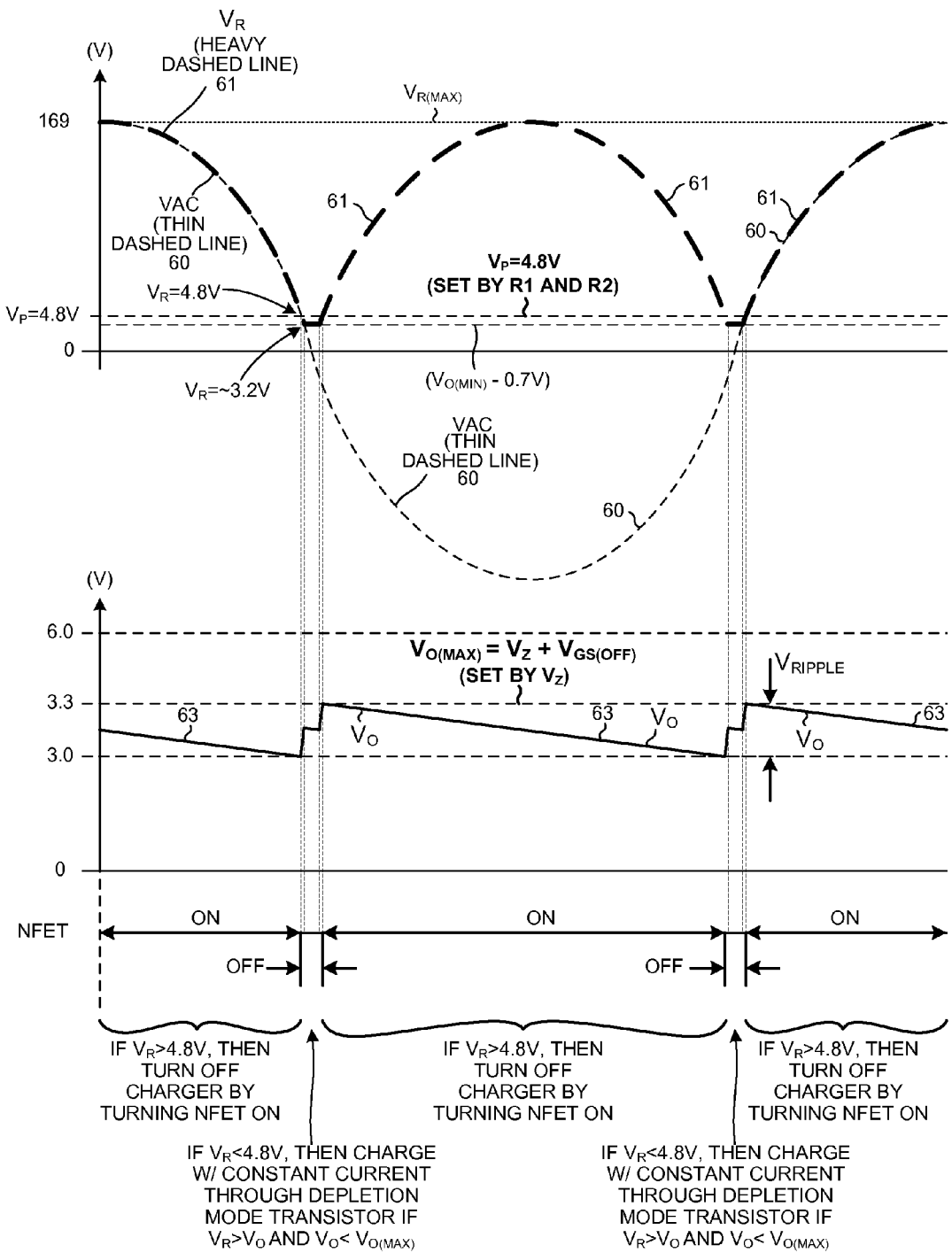
FIG. 4 is a simplified waveform diagram that illustrates operation of the power supply circuit 20 of FIG. 3.

FIG. 4 is a waveform diagram that illustrates operation of power supply circuit 20 of FIG. 3. In the upper part of the diagram, the thin dashed line 60 represents the incoming 120 VAC sinusoidal 60 Hz voltage received from AC source 23. The heavy dashed line 61 represents rectified periodic voltage signal $V_R$ on node 43. The maximum value $V_{R(MAX)}$ of the $V_R$ signal is +169 volts. The signal $V_R$, at its lowest point, does not drop below 3.2 volts because there is no way for $V_R$ node 43 to discharge due to the blocking action of bridge rectifier 25. At most, $V_R$ is 0.7 volts lower than $V_O$ due to the body diode 62 of dep-FET 28. The anode of body diode 62 is coupled to $V_O$ node 45 and the cathode of body diode 62 is coupled to $V_R$ node 43.

Accordingly, in steady state operation of the power supply circuit 20, signal $V_R$ is always of adequate magnitude to supply power to comparator 33 via supply lead 49. In other embodiments, the supply lead 49 of comparator 33 is connected to $V_O$ node 45 rather than to node 47. A signal diode is then provided between the non-inverting input lead 46 of comparator 33 and supply voltage lead 49 of comparator to protect the comparator 33 from overvoltage. The anode of this diode is coupled to the non-inverting input lead 46 and the cathode of this diode is coupled to the supply voltage lead 49 so that the diode can source current from node 47 into capacitor 22.

As indicated in the bottom portion of FIG. 4, NFET 37 is turned on whenever $V_R$ is detected to be higher than the first predetermined voltage $V_P$ of 4.8 volts. Line 63 represents the output voltage $V_O$. During the times when NFET 37 is on, $V_O$ slowly decreases because capacitor 22 is being discharged due to its having to supply microcontroller 24 with supply current. The magnitude of the decrease in $V_O$ is determined by the frequency of the AC input voltage waveform, the amount of supply current $I_O$ to be supplied to the load, and by the capacitance of storage capacitor 22. In the present example, $V_{O(MIN)}$ is 3.0 volts. During the times when NFET 37 is off, the charging circuit 26 may supply the substantially constant charging current $I_{CHARGE}$ to storage capacitor 22 so that the voltage $V_O$ on the storage capacitor will increase up to its maximum value of $V_{O(MAX)}$. The substantially constant charging current $I_{CHARGE}$ in the present example is one ampere.

Figure 5:
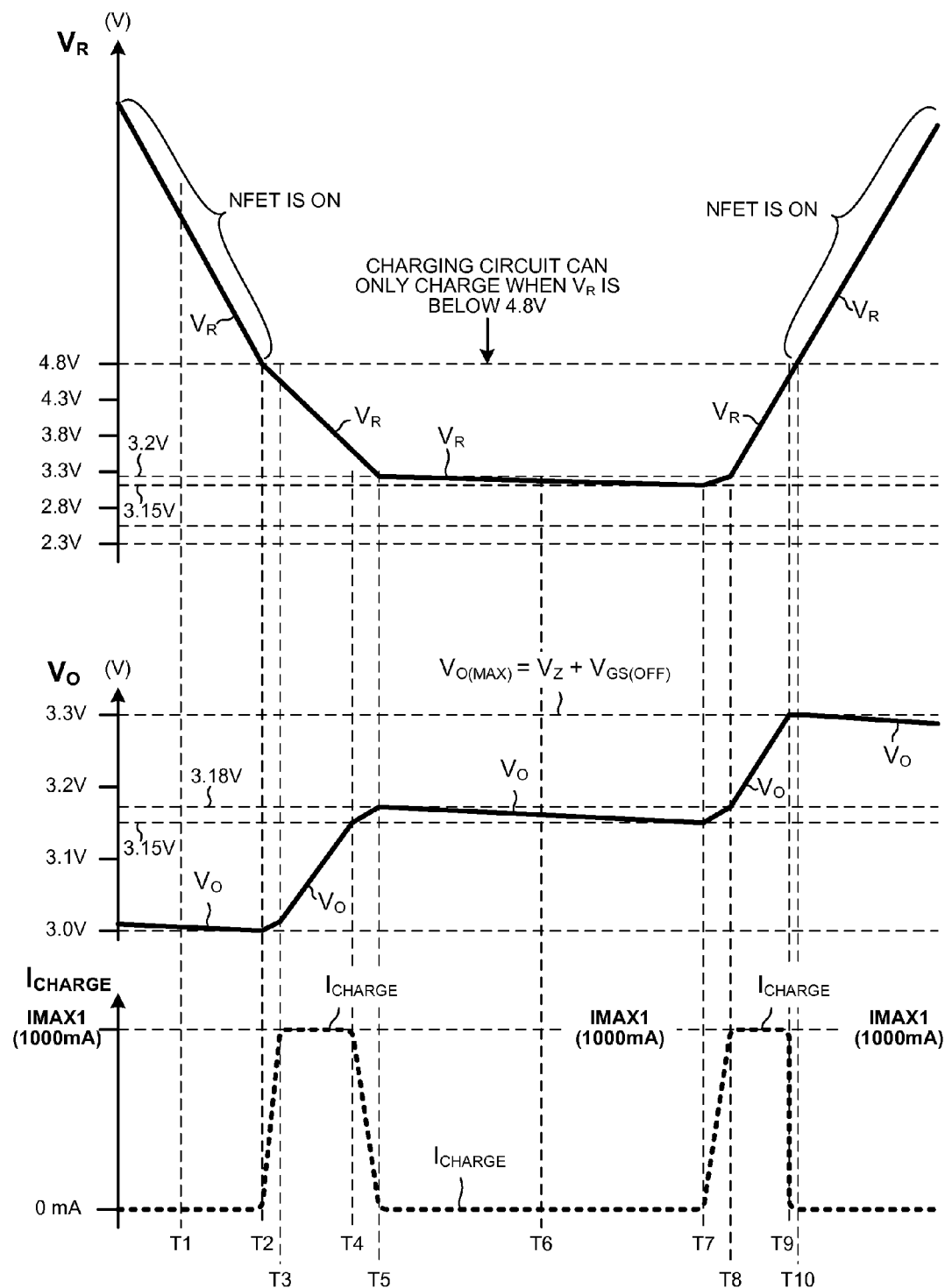
FIG. 5 is a simplified waveform diagram that shows, in further detail, two times when the charging current $I_{CHARGE}$ flows in the waveforms of FIG. 4.

FIG. 5 is a waveform diagram that shows two times when the charging current $I_{CHARGE}$ flows in further detail. During each low point in $V_R$, there are two intervals of time when the substantially constant charging current $I_{CHARGE}$ flows. At time T1, $V_R$ is greater than $V_P$, so NFET 37 is turned on and dep-FET 28 is turned off and $V_O$ node 45 is decoupled from the $V_R$ node 43. No charging current flows. At time T2, when $V_R$ drops to be less than $V_P$, NFET 37 is turned off. Because $V_O$ is below the second predetermined voltage $V_{O(MAX)}$ and because $V_R$ is adequately higher than $V_O$, dep-FET 28 starts to turn on. By time T3, the charging current has reached its substantially constant value of one ampere. The charging current $I_{CHARGE}$ flows from $V_R$ node 43 to $V_O$ node 45 and to storage capacitor 22. As explained above, the magnitude of the charging current $I_{CHARGE}$ is substantially constant due to increased charging current flow serving to decrease the on resistance of dep-FET 28. All this time, $V_R$ is decreasing. At time T4, $V_R$ is so low with respect to $V_O$ that the charging circuit can no longer maintain constant current charging. For constant current charging at one ampere, $V_R$ must be 1.5 volts higher than approximately $V_O$. The 1.5 volts is the sum of the $R_{DS(ON)}$ of the dep-FET and the resistance of $R_S$, multiplied by one ampere. At time T5, $V_R$ is so low with respect to $V_O$ that the charging current flow stops entirely. From time T5, to T6, to T7, no charging current flows. The voltage $V_O$ on storage capacitor 22 decreases slightly due to capacitor 22 being discharged by the load. At time T7, when $V_R$ is again higher than $V_O$, charging resumes. When $V_R$ is adequately higher than $V_O$ at time T8 (adequately higher considering the specific $R_{DS(ON)}$ of dep-FET 28 at this time), charging continues with the substantially constant charging current $I_{CHARGE}$. The voltage $V_O$ on storage capacitor 22 increases back up to its $V_{O(MAX)}$ value of 3.3 volts. At time T9 the voltage $V_O$ on the storage capacitor 22 reaches 3.3 volts. The source-to-gate voltage across the dep-FET is therefore 2.5 volts due to the gate voltage of the dep-FET being fixed by the zener diode at 0.8 volts. Because $V_{GS(OFF)}$ of the dep-FET is 2.5 volts, the dep-FET is turned off at time T9 when $V_O$ reaches 3.3 volts. Regardless of whether the storage capacitor 22 is fully charged or not, when $V_R$ then increases further and exceeds the first predetermined voltage $V_P$, NFET 37 is turned on again, and the charging circuit 26 is disabled. This occurs at time T10 in the illustrative waveform diagram.

Figure 1:
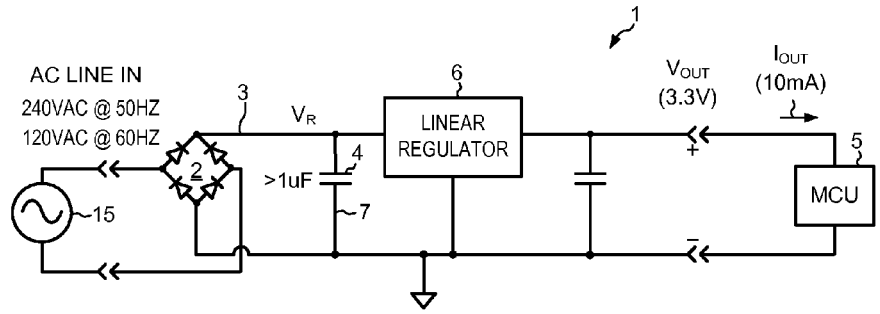
FIG. 1 (Prior Art) is a diagram of a linear regulator.
Figure 2:
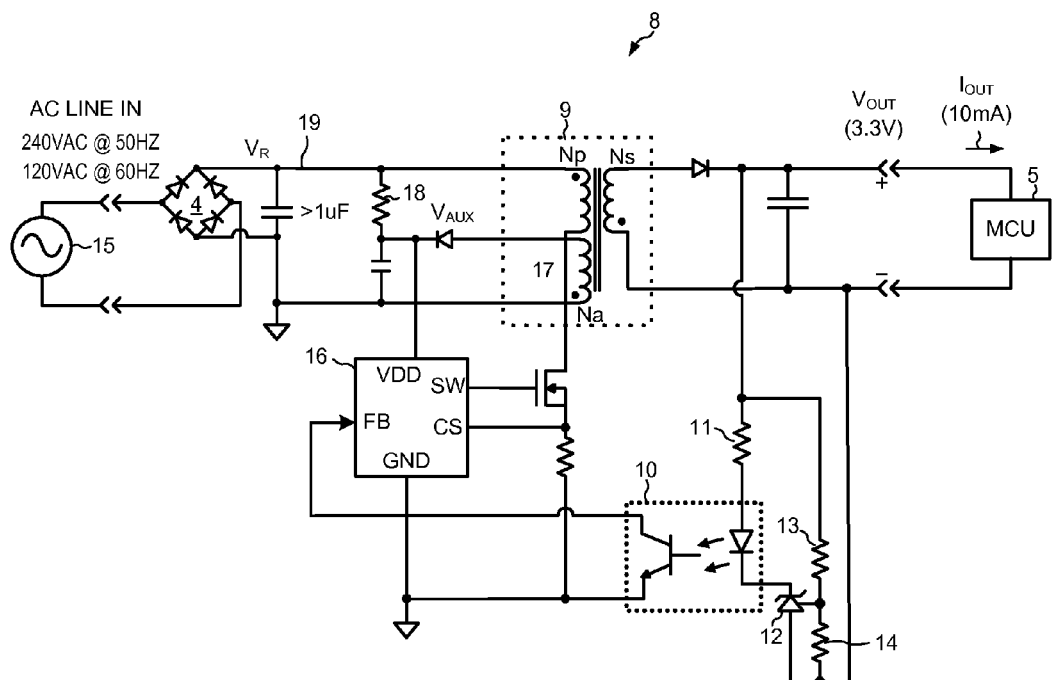
FIG. 2 (Prior Art) is a simplified diagram of a flyback switching power supply.

Because storage capacitor 22 is only charged when the magnitude of $V_R$ is close to $V_O$, there is not a large voltage drop across the charging circuit 26 during the times when the charging current $I_{CHARGE}$ flows. As a result, power dissipation in power supply circuit 20 is reduced as compared to the power dissipation in a linear regulator of the type set forth in FIG. 1. Power supply circuit 20 includes no inductive components or opto-isolators as compared to the flyback converter of FIG. 2. Such inductive components and opto-isolators are expensive. Moreover, there is no expensive and failure-prone large capacitor attached to the $V_R$ node of the bridge rectifier. In one specific example, there is no such capacitor coupled to $V_R$ node 43 and there is less than 0.5 microfarads of total capacitance on $V_R$ node 43. In a power on reset condition starting with a fully discharged storage capacitor 22, the voltage $V_O$ on storage capacitor 22 reaches $V_{O(MAX)}$ relatively quickly in about 90 milliseconds. This is acceptable for many microcontroller applications where execution of microcontroller self-initialization routines after power up take about 100 milliseconds to complete. In applications where the overall system is being frequently power switched to spend a substantial proportion of its operating time in a start up condition, the power supply circuit 20 is efficient as compared to a switching power supply that exhibits linear low efficiency performance during start up operation.

Figures 6, 7:
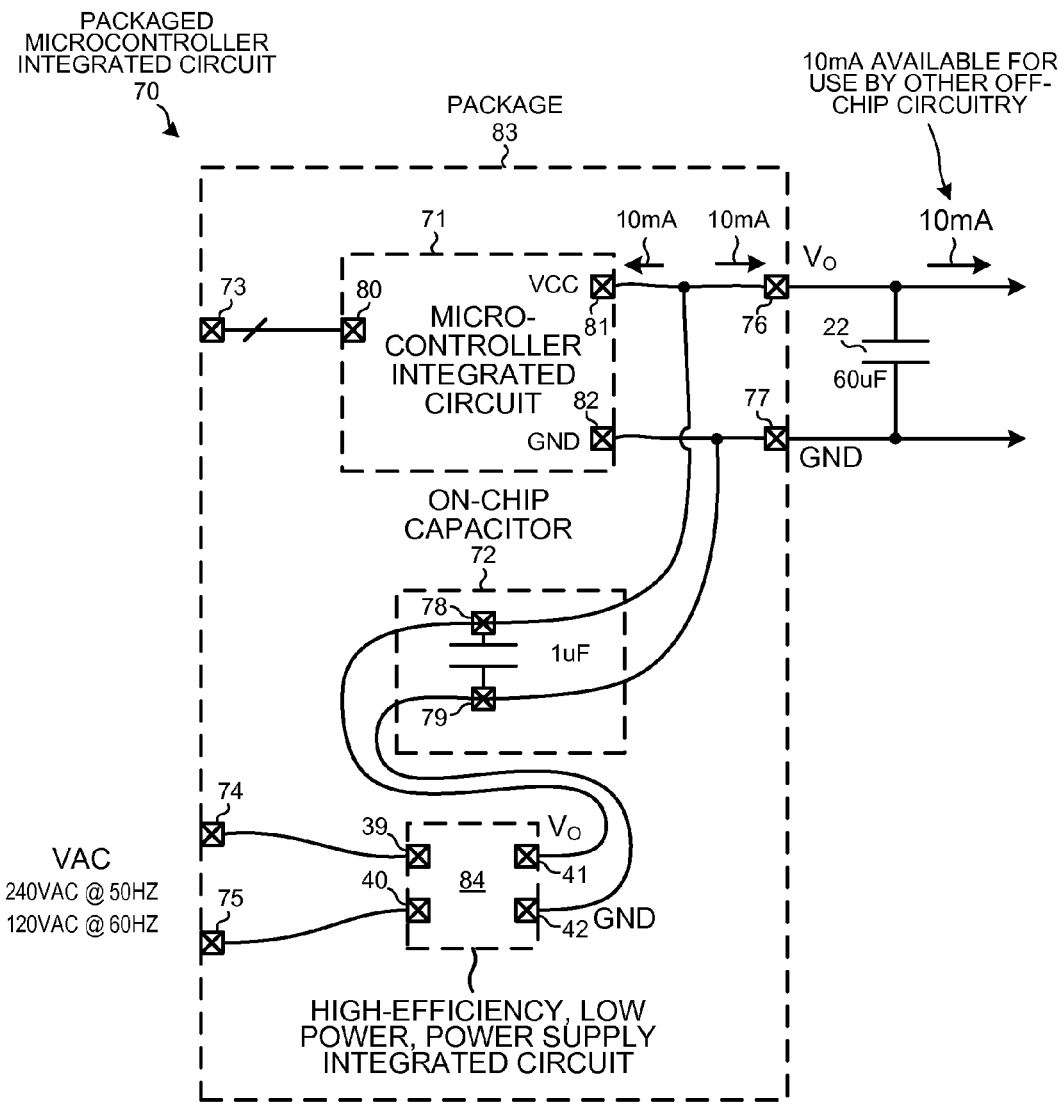
FIG. 6 is a table that sets forth operational characteristics of the power supply circuit 20 of FIG. 3.
FIG. 7 is a diagram of a packaged microcontroller integrated circuit that includes the power supply circuit 20 of FIG. 3.

FIG. 6 is a table that sets forth operational characteristics of power supply circuit 20 of FIG. 3.

FIG. 7 is a diagram of a packaged microcontroller integrated circuit 70. Packaged microcontroller integrated circuit 70 includes a microcontroller integrated circuit die 71, an on-chip capacitor 72, and a power supply integrated circuit die 84. Power supply integrated circuit die 84 is an unpackaged die version of the power supply integrated circuit 21 illustrated in FIG. 3. All three components 71, 72 and 84 are packaged together in a package 83. Package 83 may be any type of package in which a microcontroller is packaged such as an injection molded plastic quad flat pack or DIP package. Terminals 73-77 are terminals of package 83. Terminals 39-42 and 78-82 are integrated circuit terminals such as bond pads. Wire bonds and lead frame details are not shown in the simplified illustration of FIG. 7. Microcontroller integrated circuit 71 consumes about ten milliamperes of the twenty milliamperes of supply current provided by power supply circuit 84, 72 and 22. This ten milliamperes of supply current flows into microcontroller integrated circuit 71 via supply input voltage terminal 81. The remaining ten milliamperes of supply current is available for use by other external circuits.

Although a microcontroller die is set forth as an example of a die that can be powered by the power supply circuit, the packaged device 70 of FIG. 7 may involve another type of circuit in the place of die 71. For example, the packaged device may involve a memory integrated circuit or linear analog circuitry in the place of die 71. In one example, a whole family of AC-powered parts is realized, where each part of the family includes an instance of integrated circuit 84 and on-chip capacitor 72, but where each part includes a different type of integrated circuit in place of the microcontroller integrated circuit 71 of FIG. 7. Parts of the family are provided with intercommunication capabilities such that parts of the family provide add on auxiliary capabilities to the microcontroller member of the family. In addition, power supply integrated circuit 21 is made available separately in its own package so that a printed board level designer can provide integrated circuit 21 and capacitor 22 on the printed circuit board to supply a small amount of supply power to other circuitry on the printed circuit board.

Figure 8:
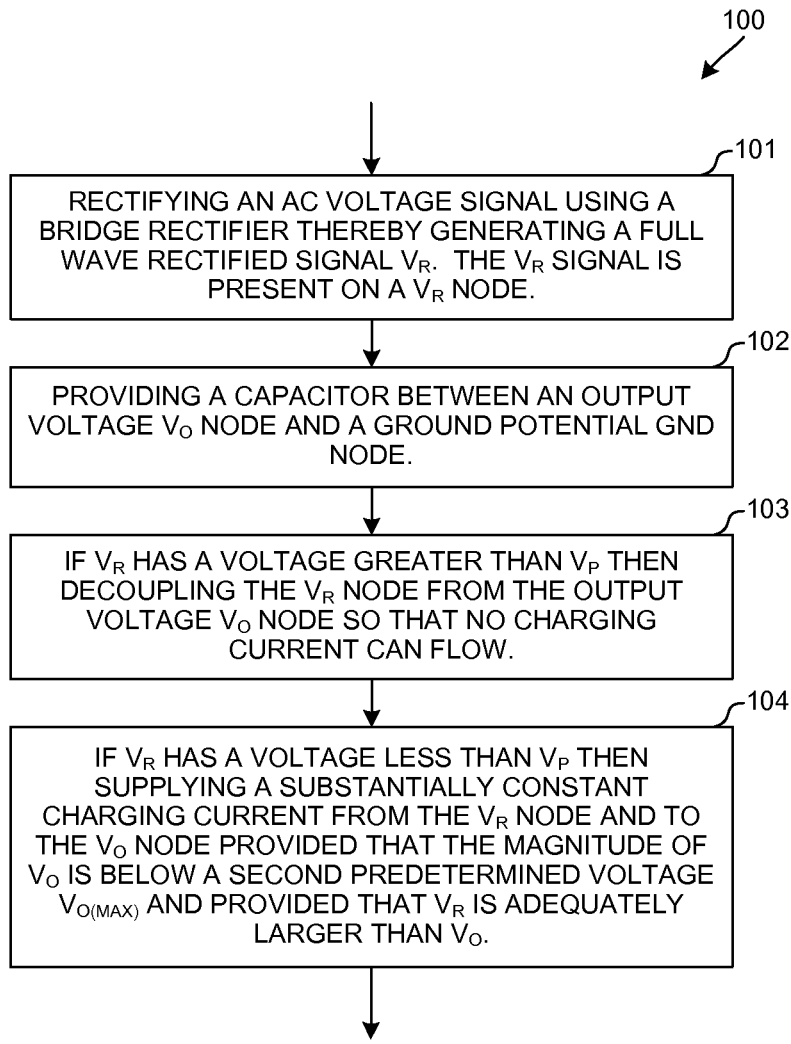
FIG. 8 is a flowchart of a method 100 in accordance with one novel aspect.

FIG. 8 is a flowchart of a method 100 in accordance with one novel aspect. A full wave bridge rectifier is used to rectify (step 101) an incoming AC voltage signal (for example, a sinusoidal 120 VAC 60 Hz voltage) thereby generating a full wave rectified signal $V_R$. The full wave rectified signal $V_R$ is present between a $V_R$ node and a ground potential GND node. A storage capacitor is provided (step 102) between an output voltage $V_O$ node and the ground potential node GND. If $V_R$ is greater than $V_P$ then the $V_R$ node is decoupled (step 103) from the $V_O$ node such that no current can flow from the $V_R$ node to the $V_O$ node. If $V_R$ is less than $V_P$ then a substantially constant charging current $I_{CHARGE}$ is supplied (step 104) from the $V_R$ node and to the $V_O$ node provided that $V_O$ is below a second predetermined voltage $V_{O(MAX)}$ and provided that $V_R$ is adequately larger than $V_O$. The exposition of method 100 in the form of blocks in a flowchart does not indicate that the operations set forth in the various blocks must necessarily be performed in some order. The operations of blocks 101 and 102 are generally being performed continuously. At a given time, $V_R$ can only be either larger or smaller than 4.8 volts.

Accordingly, although the determining of whether $V_R$ is above or below $V_P$ may occur continuously, at most one of the operations set forth in blocks 103 and 104 is being performed at a given time.

Although certain specific embodiments are described above for instructional purposes, the teachings of this patent document have general applicability and are not limited to the specific embodiments described above. In some examples, the reference voltage generator for the comparator of the voltage detector circuit is not a bandgap voltage reference but rather is another type of reference such as a zener diode. Although an example is set forth above where the storage capacitor is charged with pulses of a substantially constant charging current, in other examples the pulses of charging current are not pulses having a substantially constant magnitude. The second predetermined voltage $V_{O(MAX)}$ need not be set by a zener diode but rather may be set in other ways. The power supply circuit can be adapted to use a switch other than a depletion mode n-channel field effect transistor. The rectifier need not be a full wave rectifier, but in some embodiments is a half wave rectifier. In some embodiments, the first predetermined voltage $V_P$ and/or the magnitude of the substantially constant charging current $I_{CHARGE}$ are software programmable due to resistances R2 and/or $R_S$ being digitally adjustable under software control. The software (processor-executable instructions) for adjusting $V_P$ and $I_{CHARGE}$ in one example is stored in memory (a processor-readable medium) on microcontroller die 71, and a digital interface is provided on die 84 via which the microcontroller writes control information into die 84.

Figure 9:
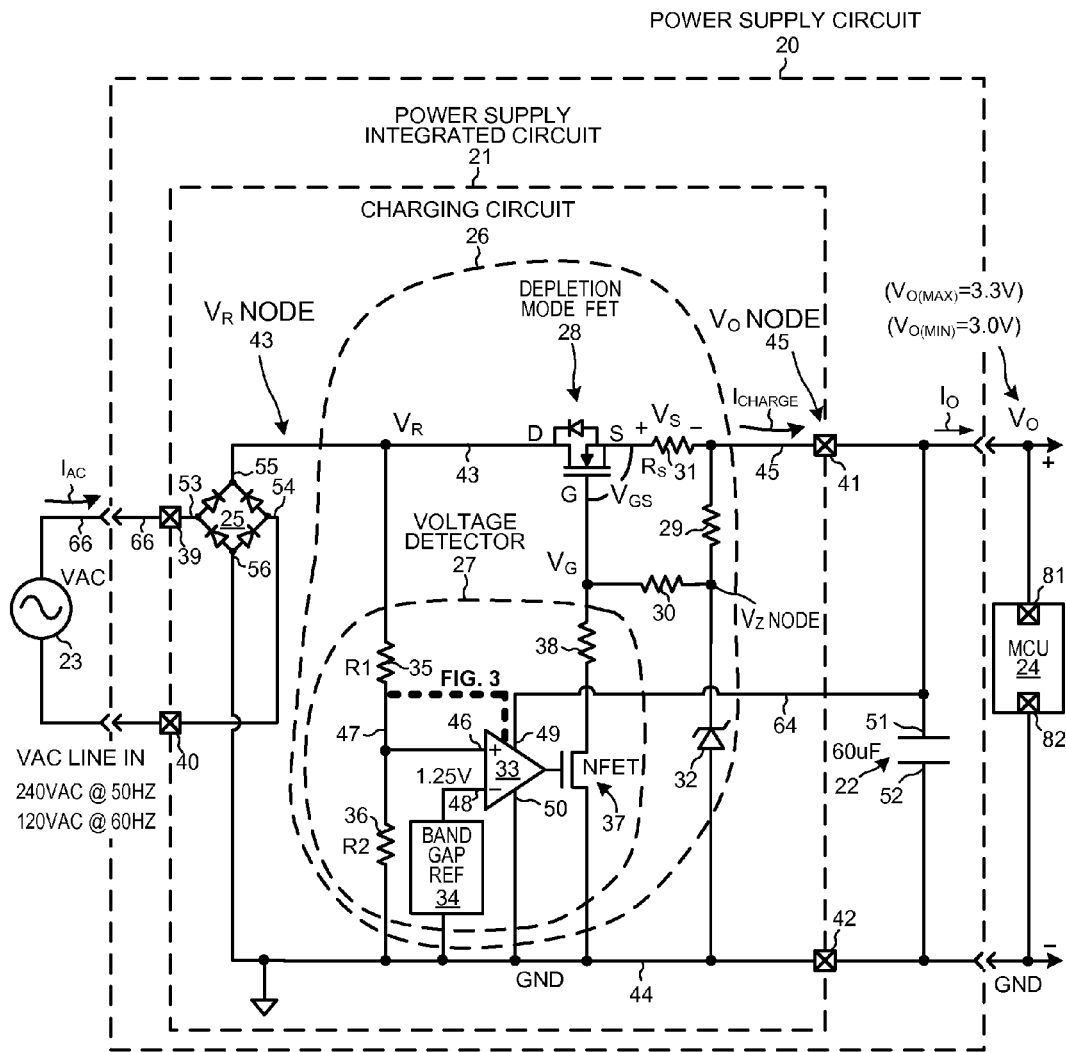
FIG. 9 is circuit diagram of an alternative embodiment in which the comparator of the voltage detector is powered from the $V_O$ node.

FIG. 9 is a circuit diagram of an alternative embodiment of the power supply circuit 20 of FIG. 3. Rather than the comparator 33 receiving its supply current from the $V_R$ node 43 through resistor 35 as in FIG. 3, the comparator 33 receives its supply current from the output node $V_O$ 45 via conductor 64. During steady state operation mode operation, the voltage on the $V_O$ output node 45 is controlled to be about three volts DC. Accordingly, the supply current for comparator 33 need not pass across a large voltage drop on its way to the supply voltage lead 49 of comparator 33. The associated power dissipation that would occur due to a larger voltage drop is avoided. In the circuit of FIG. 3, on the other hand, the voltage on node $V_R$ at times during the AC cycle is high and consequently the supply current for comparator 33 experiences a voltage drop as it flows across resistor 35 and to the power supply lead 49 of comparator 33. In the circuit of FIG. 9, powering the comparator 33 from the output node results in comparator 33 being initially unpowered when the power supply circuit 20 is first coupled to AC power source 23 (or is otherwise initially powered up). When the power supply circuit 20 is unpowered, the output capacitor 22 is discharged and consequently comparator 33 does not receive its supply current at a high enough voltage. Comparator 33 is therefore not operational. Time is required to charge output capacitor 22 to an adequate voltage such that comparator 33 becomes operational. In the present example, comparator 33 requires a supply voltage of about 1.0 volts to begin operating properly. Because comparator 33 is initially not operational when the power supply circuit is first powered up, NFET 37 remains non-conductive and the voltage detector circuit 27 is not operational. During steady state operation mode, it is the voltage detector 27 that turns off dep-FET 28 if $V_R$ goes above the first predetermined voltage $V_P$ of 4.8 volts. Therefore, during initial power up operation of the circuit of FIG. 9 when the voltage detector 27 is not operational, the dep-FET 28 can remain on as $V_R$ increases even if $V_R$ exceeds the first predetermined voltage. As a result, each pulse of charging current may be of a longer duration than are the pulses of charging current that occur later during normal steady state operation.

Figure 10:
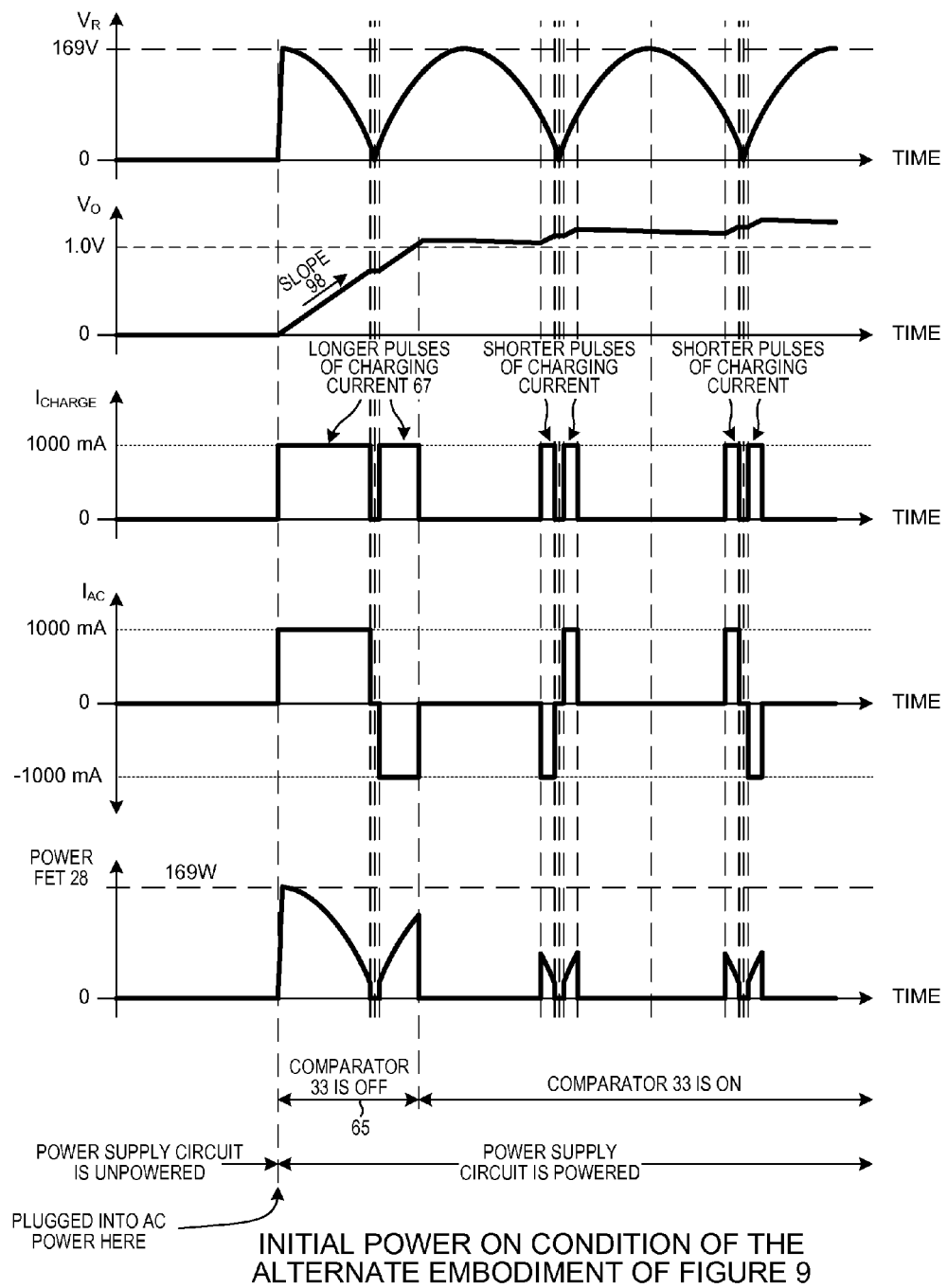
FIG. 10 is a waveform diagram that illustrates an operation of the alternative embodiment of FIG. 9.

FIG. 10 is a waveform diagram that illustrates operation of the power supply circuit 20 of FIG. 9. During initial time period 65, transient voltages and currents in the circuit are such that longer pulses of charging current $I_{CHARGE}$ are seen to flow from the $V_R$ node to the $V_O$ node. The time period 65 during which these pulses occur may be of short duration, such as one or only a few AC cycles, but in accordance with one novel aspect it is recognized that in some applications these pulses result in undesirable noise being injected back onto the supply line 66 from the AC source 23. Note that in the waveform $I_{AC}$ in FIG. 10, that the pulses 67 of charging current are of longer duration than are charging current pulses that occur later during steady state operation mode operation of the circuit.

Figure 11:
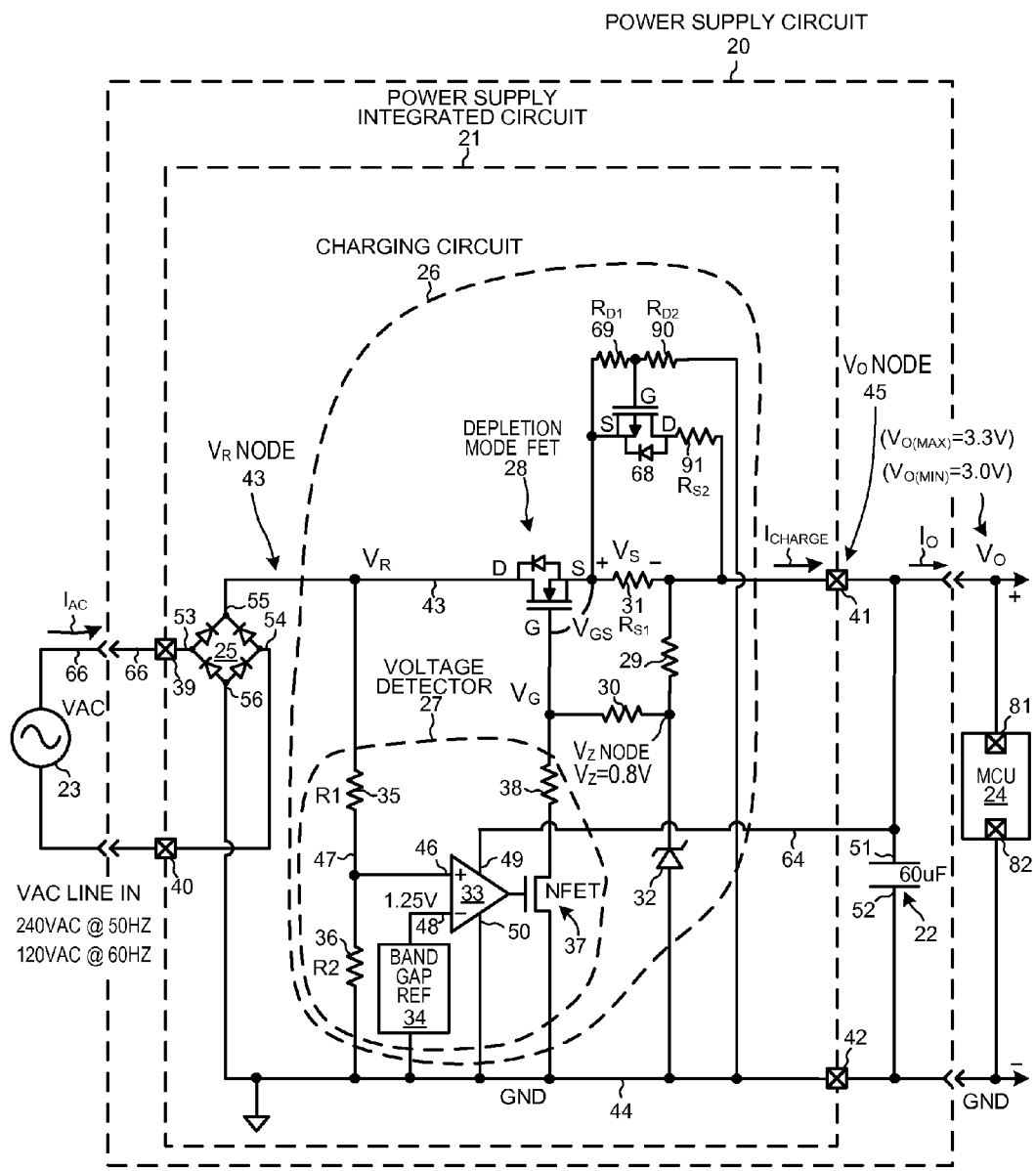
FIG. 11 is a circuit diagram of a non-isolated AC-to-DC power supply circuit that has a higher maximum charging current ($I_{MAX1}$) in a steady state operation mode, and that has a lower maximum charging current ($I_{MAX2}$) in an initial power up operation mode, in accordance with another embodiment.

FIG. 11 is a circuit diagram of an embodiment of the power supply circuit 20 in accordance with another novel aspect. The feedback resistance circuit that serves to set the maximum value of the substantially constant charging current is modified to include a P-channel field effect transistor 68, a voltage divider involving resistors 69 and 90, and resistor 91. If the output voltage $V_O$ is adequately high (greater than a third predetermined $V_{THRESH}$ voltage of 2.5 volts) during steady state operation of the power supply circuit, then at times in which a charging current $I_{CHARGE}$ flows there is a sufficient voltage between the source of dep-FET 28 and the ground node 44 that the voltage divider of resistors 69 and 90 causes the $V_{GS}$ of the P-channel FET 68 to be higher than the 1.2 volt $V_{GS(ON)}$ of the P-channel FET 68. As a result, during normal steady state operation, the P-channel transistor 68 is conductive when a charging current $I_{CHARGE}$ is flowing. The P-channel FET 68 being conductive couples resistor $R_{S2}$ 91 in parallel with resistor $R_{S1}$ 31, thereby reducing the overall effective resistance of the feedback resistance that sets the maximum limit value of the charging current $I_{CHARGE}$ The resistances of the voltage divider resistors $R_{D1}$ 69 and $R_{D2}$ 90 are selected so that the P-channel transistor 68 is turned on if $V_O$ exceeds the third predetermined voltage $V_{THRESH}$ (about 2.5 volts). Turning on the P-channel FET 68 serves to reduce the Thevenin equivalent resistance of the feedback resistance circuit (looking into the feedback resistance circuit from the source of dep-FET 28). Due to the reduced Thevenin equivalent resistance, the charging current $I_{CHARGE}$ has a first maximum limit value of $I_{MAX1}$.

In the present example, the values of the resistors 91 and 31 are selected such that $I_{MAX1}$ is about 1000 milliamperes. The value of resistor 91 is about one ohm, and the value of resistor 31 is about ten ohms.

If, however, the output voltage $V_O$ is not greater than $V_{THRESH}$ (2.5 volts), then the voltage drop across resistor 69 will not be large enough to turn on P-channel FET 68 when the charging current $I_{CHARGE}$ is flowing. Because the P-channel FET 68 is not conductive, the resistance of the feedback resistance circuit is higher than it otherwise would be were the P-channel FET 68 to be conductive. Resistor $R_{S2}$ 91 is not coupled in parallel with resistor $R_{S1}$ 31. The charging current $I_{CHARGE}$ therefore has a second maximum limit value of $I_{MAX2}$. The values of the resistors 71 and 31 are selected such that $I_{MAX2}$ is about 300 milliamperes.

Accordingly, during initial power up operation mode operation of the power supply circuit 20 of FIG. 11, charging current flow from the $V_R$ node to the $V_O$ node will be limited to be less than the second maximum limit value $I_{MAX2}$ (for example, 300 mA). Limiting the maximum value of charging current pulses serves to reduce the amount of noise injected onto supply voltage conductors from the AC voltage source.

In one advantageous aspect, there is no EMI (Electro Magnetic Interference) protection circuitry disposed between the rectifier 25 of the power supply circuit and the AC voltage source 23. In contrast to the initial power up operation mode, later during normal steady state operation mode operation of the power supply circuit 20 of FIG. 11 the charging current flow from the $V_R$ node to the $V_O$ node will be limited to be less than the first maximum limit value $I_{MAX1}$ (for example, 1000 mA).

Figure 12:
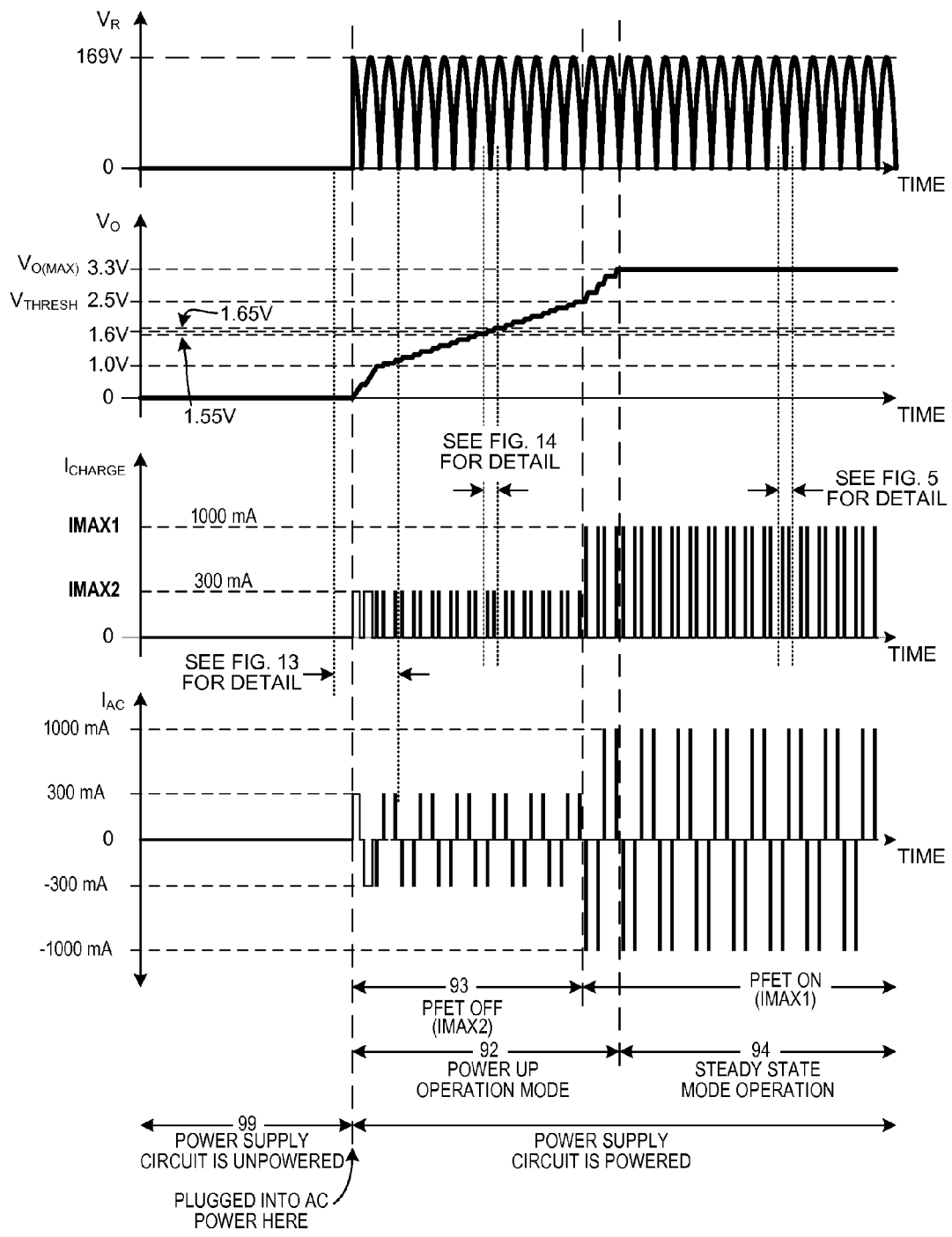
FIG. 12 is a waveform diagram that illustrates operation of the non-isolated AC-to-DC power supply circuit of FIG. 11.

FIG. 12 is a waveform diagram that illustrates operation of the power supply circuit 20 of FIG. 11. During initial time period 99, the power supply circuit 20 is not powered. AC power is then applied. The full-wave rectified and periodic signal $V_R$ present on $V_R$ node 43 is illustrated in the upper waveform of the diagram. After AC power is applied, the power supply circuit 20 of FIG. 11 then begins operating in the power up operation mode. Operation in the power up mode is shown during time period 92. During the initial time period 93 after AC power is applied, the P-channel FET 68 is off and the charging current $I_{CHARGE}$ is set to have the lower maximum value of $I_{MAX2}$. Reference numeral 94 identifies the subsequent time period during which the power supply circuit 20 operates in the steady state operation mode. Throughout steady state operation mode time period 94, the charging current $I_{CHARGE}$ is set to have the higher maximum value of $I_{MAX1}$.

Figure 13:
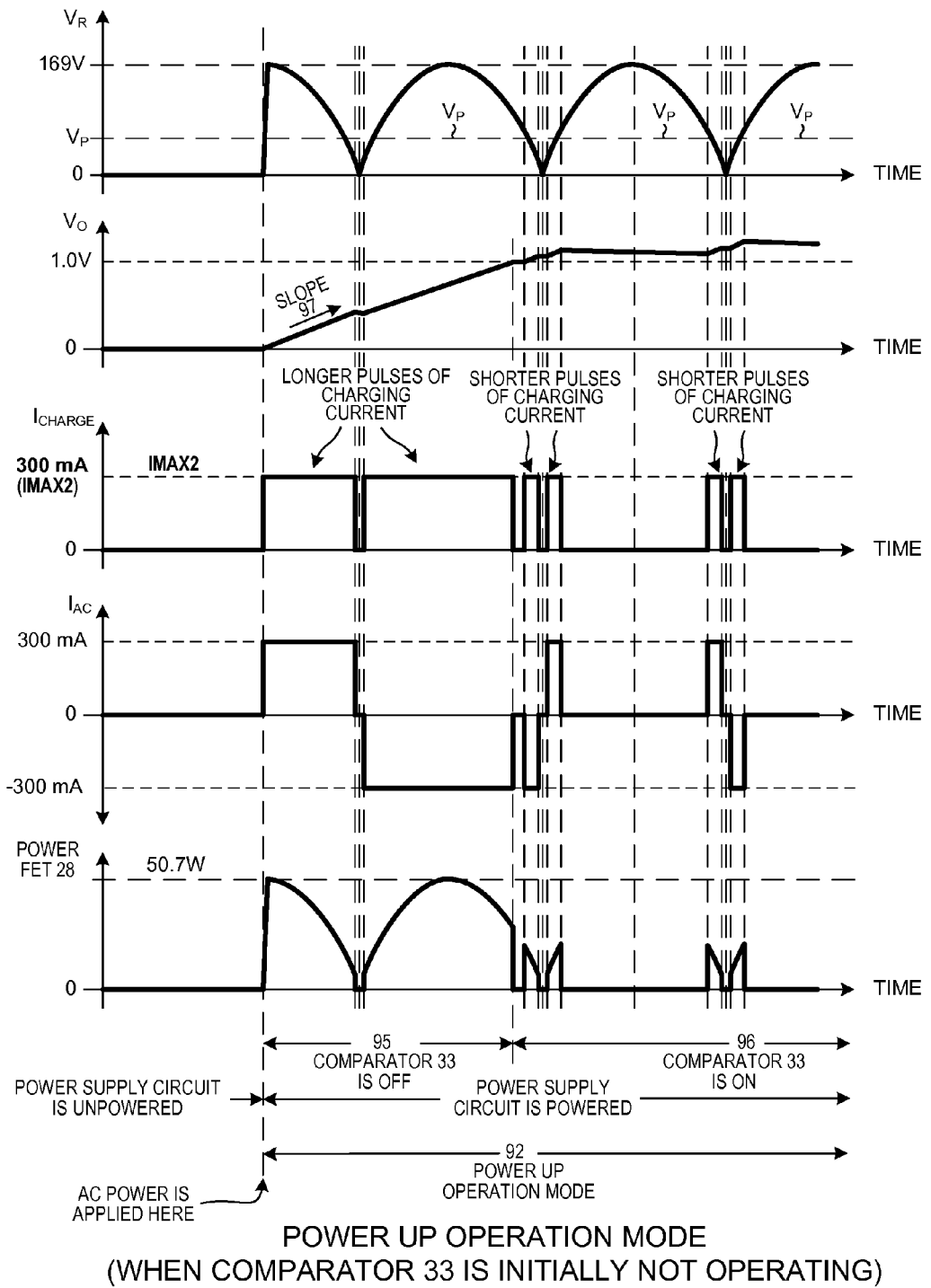
FIG. 13 is a waveform diagram that shows operation of the AC-to-DC power supply circuit of FIG. 11 at the beginning of its operation in the power up operation mode.

FIG. 13 is a waveform diagram that shows operation of the power supply circuit 20 of FIG. 11 just after AC power has been applied during initial operation in the power up operation mode. During initial time period 95, the comparator 33 is non-operational. After one or a few cycles of the AC supply voltage VAC, the output voltage $V_O$ has risen enough that comparator 33 becomes operational. Reference numeral 96 identifies the time during which the comparator 33 is powered and operational. During the first part of the time period 92 when $V_O$ is smaller than $V_{THRESH}$ (2.5 volts), the maximum value of the charging current $I_{CHARGE}$ is set to $I_{MAX2}$. Once the output voltage $V_O$ reaches $V_{THRESH}$ (2.5 volts), then the maximum value of the charging current $I_{CHARGE}$ is set to $I_{MAX1}$. The maximum value of $I_{MAX1}$ is then used throughout operation in the steady state operation mode. The slope 97 of increase in the output voltage $V_O$ during the first cycle of the incoming AC voltage supply in FIG. 13 is less steep that is the steeper slope 98 of the increase in the output voltage $V_O$ during the first cycle of the incoming AC voltage supply $V_O$ in FIG. 10.

Figure 14:
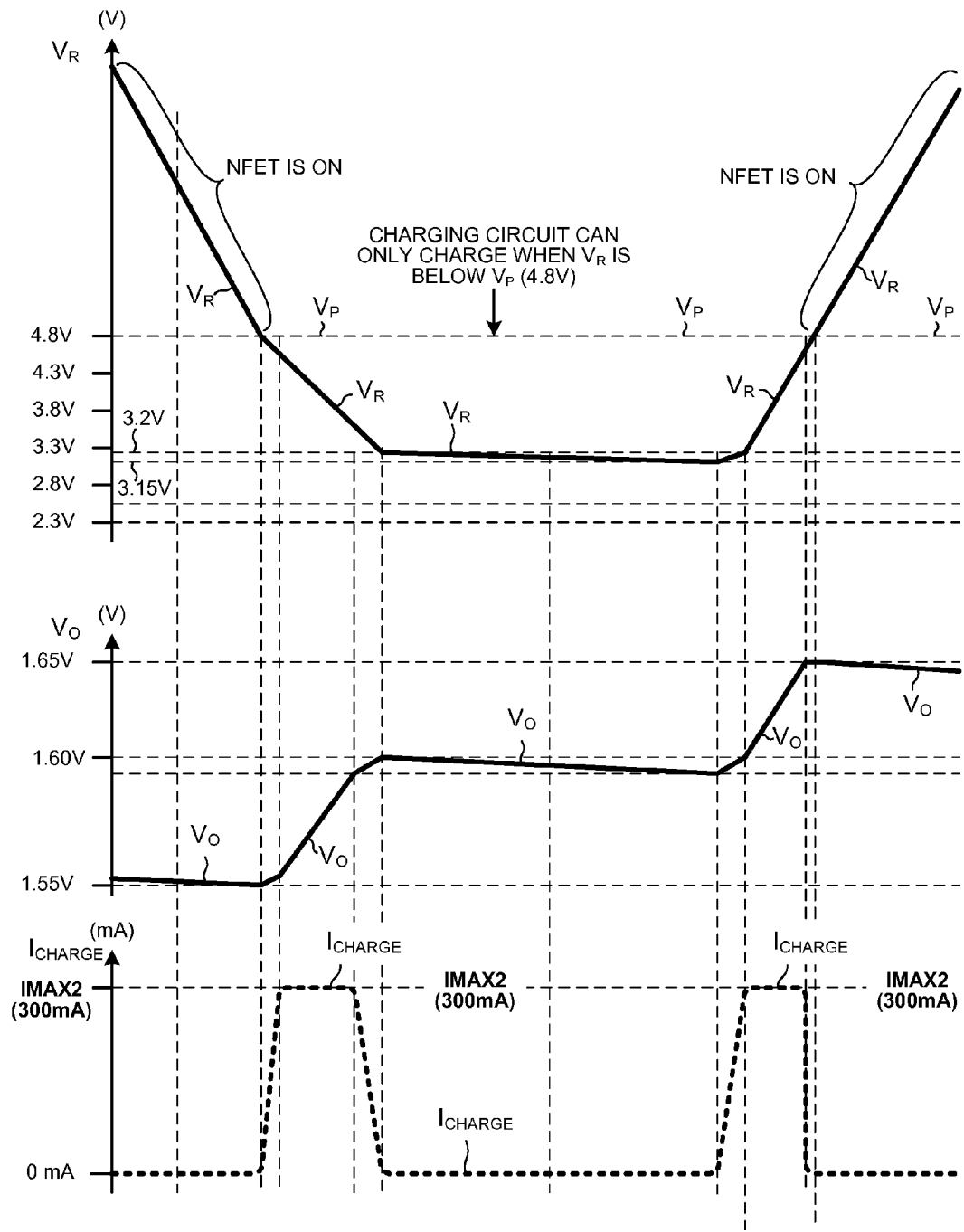
FIG. 14 is a waveform diagram that shows operation of the AC-to-DC power supply circuit of FIG. 11 at a later time during the power up operation mode.

FIG. 14 is a simplified waveform diagram that illustrates operation in the power up operation mode during a time period after the time period illustrated in FIG. 13. In the time period of FIG. 14, the voltage $V_R$ does not actually reach zero volts, but rather is about 3.15 volts at its lowest as explained above in connection with FIGS. 4 and 5. During the time period of FIG. 14, the output capacitor 22 is charged with two pulses of charging current $I_{CHARGE}$, where the maximum value of each of the pulses is $I_{MAX2}$. P-channel FET 68 is off throughout this time. The comparator 33 and the voltage detector 27 are, however, operational. Voltage detector 27 and dep-FET 28 operate to prevent any charging current pulse from flowing through the power supply circuit when $V_R$ exceeds the first predetermined voltage (for example, 4.8 volts). The magnitude of the output voltage $V_O$ is stepping up from pulse to pulse of the charging current.

Figure 15:
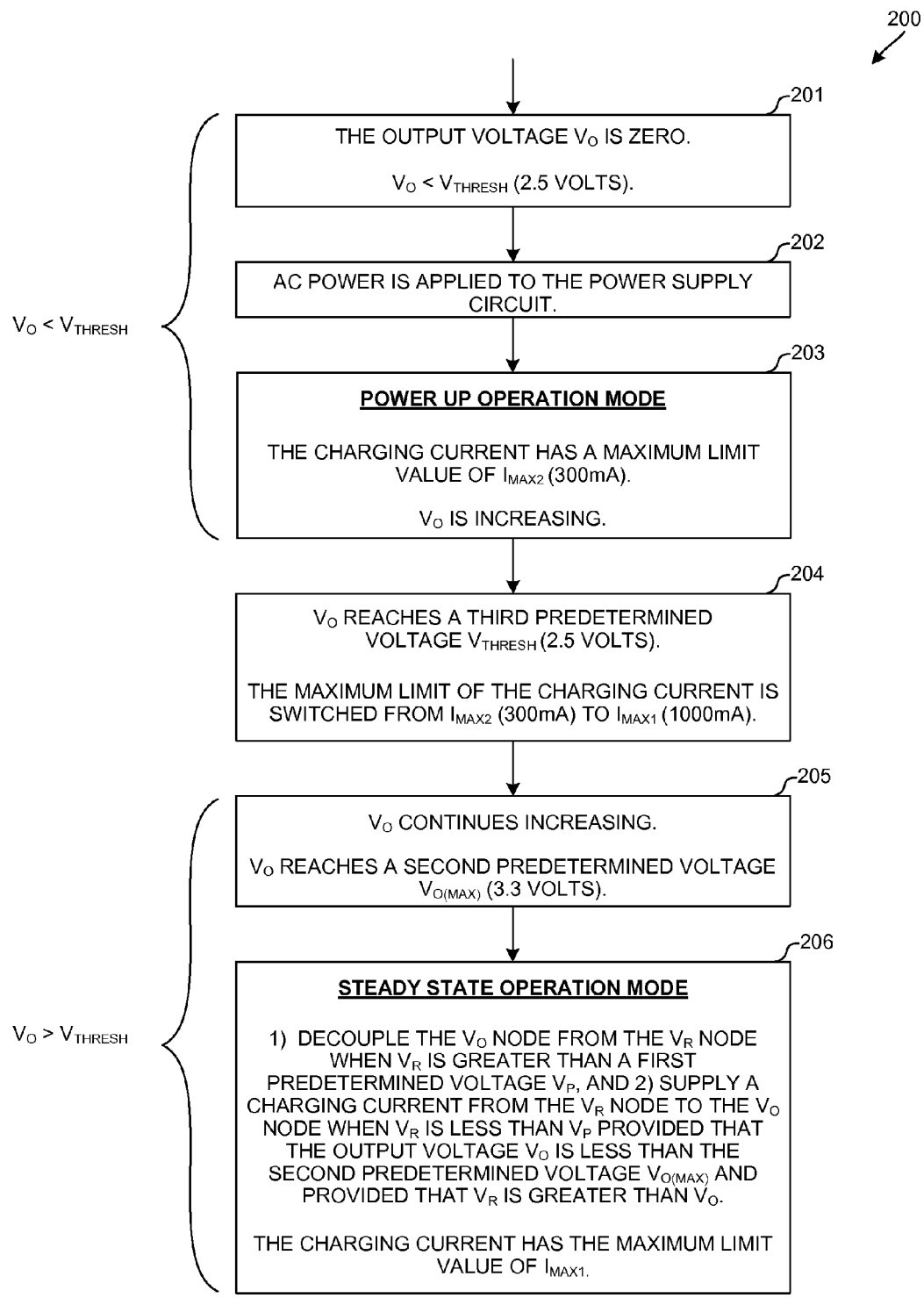
FIG. 15 is a flowchart of a method 200 involving the AC-to-DC power supply circuit of FIG. 11 in accordance with another novel aspect.

FIG. 15 is a flowchart of a method 200 of operation of the non-isolated AC-to-DC power supply circuit of FIG. 11 in accordance with another novel aspect. Initially (step 201), the power supply circuit is unpowered and the output voltage $V_O$ is zero. The power supply circuit is then plugged into AC wall power or AC power is otherwise applied (step 202) to the power supply circuit. In the power up operation mode (step 203), the charging current has a maximum limit value of $I_{MAX2}$ and the output voltage $V_O$ is increasing. In one example, the output capacitor of the power supply circuit is charged during the initial power up operation mode as illustrated in the waveforms of FIG. 12. When the output voltage $V_O$ on the output capacitor reaches a third predetermined voltage $V_{THRESH}$ (2.5 volts), the maximum limit of the charging current pulses is switched (step 204) from the smaller value $I_{MAX2}$ (300 mA) to the larger value $I_{MAX1}$ (1000 mA). Charging of the output capacitor using current pulses continues, and the output voltage $V_O$ continues increasing (step 205). When $V_O$ reaches the second predetermined voltage $V_{O(MAX)}$, the charging circuit is said to be operating in the steady state operation mode. In the steady state operation mode (step 206), the charging current has the larger maximum limit value of $I_{MAX1}$. In the steady state operation mode: 1) the charging circuit of the AC-to-DC power supply circuit decouples the $V_O$ node from the $V_R$ node when $V_R$ is greater than a first predetermined voltage $V_P$ (for example, 4.8 volts), and 2) supplies a charging current from the $V_R$ node to the $V_O$ node when $V_R$ is less than $V_P$ provided that the output voltage $V_O$ is less than the second predetermined voltage $V_{O(MAX)}$ and provided that $V_R$ is greater than $V_O$. In one example, the power supply circuit operates in the steady state operation mode as illustrated in the waveforms of FIG. 12 and FIG. 5.

Although certain specific embodiments are described above for instructional purposes, the teachings of this patent document have general applicability and are not limited to the specific embodiments described above. There are many different circuits that can be used to cause a lower charging current limit to be used under start up conditions than is used under normal steady state operation. The specific circuit of FIG. 11 involving components 68, 69, 90 and 91 is just one example of a suitable circuit. Various different ways of monitoring the output voltage can be employed in such circuits. Digital logic monitoring and/or control, including control of a digitally programmable resistance by a digital logic control signal, can be employed. Accordingly, various modifications, adaptations, and combinations of various features of the described embodiments can be practiced without departing from the scope of the invention as set forth in the claims.

What is claimed is:

1. A method comprising:
   (a) receiving an AC voltage supply signal from an AC voltage source onto a rectifier and outputting a rectified voltage signal $V_R$ onto a $V_R$ node;
   (b) storing energy in a capacitor, wherein the capacitor is coupled between an output voltage node $V_O$ and a ground node GND;
   (c) in a steady state operation mode of a non-isolated AC-to-DC power supply circuit: 1) decoupling the $V_O$ node from the $V_R$ node when $V_R$ is greater than a first predetermined voltage $V_P$ and, 2) supplying a charging current ($I_{CHARGE}$) from the $V_R$ node and onto the $V_O$ node when $V_R$ is less than $V_P$ provided that $V_O$ is less than a second predetermined voltage $V_{O(MAX)}$ and provided that $V_R$ is greater than $V_O$, wherein the charging current $I_{CHARGE}$ has a first maximum limit value $I_{MAX}$ in the steady state operation mode; and
   (d) in a power up operation mode of the non-isolated AC-to-DC power supply circuit: limiting current flow from the $V_R$ node to the $V_O$ node to be less than a second maximum limit value $I_{MAX2}$, wherein $I_{MAX2}$ is less than $I_{MAX1}$, wherein the non-isolated AC-to-DC power supply circuit includes the rectifier and the capacitor and a charging circuit, and wherein the charging circuit is coupled between the $V_R$ node and the $V_O$ node.

2. The method of claim 1, wherein the rectified voltage signal $V_R$ has a peak voltage of more than one hundred volts and has a minimum voltage of less than five volts, and wherein $V_P$ is a positive voltage that is substantially smaller than the peak voltage.

3. A method comprising:
(a) receiving an AC voltage supply signal from an AC voltage source onto a rectifier and outputting a rectified voltage signal $V_R$ onto a $V_R$ node;
(b) storing energy in a capacitor, wherein the capacitor is coupled between an output voltage node $V_O$ and a ground node GND;
(c) in a steady state operation mode of a non-isolated AC-to-DC power supply circuit: 1) decoupling the $V_O$ node from the $V_R$ node when $V_R$ is greater than a first predetermined voltage $V_P$ and, 2) supplying a charging current ($I_{CHARGE}$) from the $V_R$ node and onto the $V_O$ node when $V_R$ is less than $V_P$ provided that $V_O$ is less than a second predetermined voltage $V_{O(MAX)}$ and provided that $V_R$ is greater than $V_O$, wherein the charging current $I_{CHARGE}$ has a first maximum limit value $I_{MAX1}$ in the steady state operation mode; and
(d) in a power up operation mode of the non-isolated AC-to-DC power supply circuit: limiting current flow from the $V_R$ node to the $V_O$ node to be less than a second maximum limit value $I_{MAX2}$, wherein $I_{MAX2}$ is less than $I_{MAX1}$, wherein the non-isolated AC-to-DC power supply circuit includes the rectifier and the capacitor and a charging circuit, wherein the charging circuit is coupled between the $V_R$ node and the $V_O$ node, wherein the rectified voltage signal $V_R$ has a peak voltage of more than one hundred volts and has a minimum voltage of less than five volts, wherein $V_P$ is a positive voltage that is substantially smaller than the peak voltage, and wherein the non-isolated AC-to-DC power supply circuit comprises a depletion mode field effect transistor and a feedback resistance circuit coupled in series in a current path of the charging current, the method further comprising:
(e) changing the resistance of the feedback resistance circuit so that it is smaller during the steady state operation mode than it is during the power up operation mode.

4. The method of claim 3, wherein the charging circuit and the rectifier are parts of an integrated circuit.

5. A method comprising:
(a) receiving an AC voltage supply signal from an AC voltage source onto a rectifier and outputting a rectified voltage signal $V_R$ onto a $V_R$ node;
(b) storing energy in a capacitor, wherein the capacitor is coupled between an output voltage node $V_O$ and a ground node GND;
(c) in a steady state operation mode of a non-isolated AC-to-DC power supply circuit: 1) decoupling the $V_O$ node from the $V_R$ node when $V_R$ is greater than a first predetermined voltage $V_P$ and, 2) supplying a charging current ($I_{CHARGE}$) from the $V_R$ node and onto the $V_O$ node when $V_R$ is less than $V_P$ provided that $V_O$ is less than a second predetermined voltage $V_{O(MAX)}$ and provided that $V_R$ is greater than $V_O$, wherein the charging current $I_{CHARGE}$ has a first maximum limit value $I_{MAX1}$ in the steady state operation mode; and
(d) in a power up operation mode of the non-isolated AC-to-DC power supply circuit: limiting current flow from the $V_R$ node to the $V_O$ node to be less than a second maximum limit value $I_{MAX2}$, wherein $I_{MAX2}$ is less than $I_{MAX1}$, wherein the non-isolated AC-to-DC power supply circuit includes the rectifier and the capacitor and a charging circuit, wherein the charging circuit is coupled between the $V_R$ node and the $V_O$ node, wherein the rectified voltage signal $V_R$ has a peak voltage of more than one hundred volts and has a minimum voltage of less than five volts, wherein $V_P$ is a positive voltage that is substantially smaller than the peak voltage, wherein the non-isolated AC-to-DC power supply circuit comprises a depletion mode field effect transistor and a feedback resistance circuit coupled in series in a current path of the charging current, wherein the feedback resistance circuit is coupled to the depletion mode field effect transistor, and wherein the feedback resistance circuit is coupled to the output voltage node, wherein the feedback resistance circuit has a Thevenin equivalent resistance from the perspective of the depletion mode field effect transistor looking into the feedback resistance circuit, the method further comprising:
(e) changing the Thevenin equivalent resistance of the feedback resistance circuit such that the Thevenin equivalent resistance is substantially smaller during the steady state operation mode than it is during the power up operation mode.

6. A circuit for charging a capacitor, wherein the capacitor has first lead coupled to an output voltage $V_O$ node, and wherein the capacitor has a second lead coupled to a GND node, the circuit comprising:
a full wave bridge rectifier that supplies a rectified voltage signal ($V_R$) onto a $V_R$ node, wherein a ground potential is present on the GND node; and
a charging circuit that in a steady state operation mode: 1) decouples the $V_O$ node from the $V_R$ node when $V_R$ is greater than a first predetermined voltage $V_P$ and, 2) supplies a charging current ($I_{CHARGE}$) from the $V_R$ node and onto the $V_O$ node when $V_R$ is less than $V_P$ provided that $V_O$ is less than a second predetermined voltage $V_{O(MAX)}$ and provided that $V_R$ is greater than $V_O$, wherein in the steady state operation mode the charging current $I_{CHARGE}$ has a first maximum limit value $I_{MAX1}$, whereas in a power up operation mode the charging current $I_{CHARGE}$ has a second maximum limit value $I_{MAX2}$.

7. A circuit for charging a capacitor, wherein the capacitor has first lead coupled to an output voltage $V_O$ node, and wherein the capacitor has a second lead coupled to a GND node, the circuit comprising:
a full wave bridge rectifier that supplies a rectified voltage signal ($V_R$) onto a $V_R$ node, wherein a ground potential is present on the GND node; and
a charging circuit that in a steady state operation mode: 1) decouples the $V_O$ node from the $V_R$ node when $V_R$ is greater than a first predetermined voltage $V_P$ and, 2) supplies a charging current ($I_{CHARGE}$) from the $V_R$ node and onto the $V_O$ node when $V_R$ is less than $V_P$ provided that $V_O$ is less than a second predetermined voltage $V_{O(MAX)}$ and provided that $V_R$ is greater than $V_O$, wherein in the steady state operation mode the charging current $I_{CHARGE}$ has a first maximum limit value $I_{MAX1}$, whereas in a power up operation mode the charging current $I_{CHARGE}$ has a second maximum limit value $I_{MAX2}$, wherein the charging circuit comprises a depletion mode field effect transistor and a variable resistance circuit coupled in series in a current path of the charging current, wherein the variable resistance circuit has a first resistance when the charging current has the first maximum limit value $I_{MAX1}$, and wherein the variable resistance circuit has a second resistance when the charging current has the second maximum limit value $I_{MAX2}$.

8. The circuit of claim 6, wherein the charging current $I_{CHARGE}$ has the second maximum limit value $I_{MAX2}$ when the charging circuit is in the power up operation mode provided that $V_O$ is lower than a third predetermined voltage $V_{THRESH}$.

9. The circuit of claim 8, wherein when the charging circuit is operating in the steady state operation mode the output voltage $V_O$ is greater than the third predetermined voltage $V_{THRESH}$.

10. The circuit of claim 6, wherein the rectified voltage signal $V_R$ has a peak voltage of more than one hundred volts and has a minimum voltage of less than five volts, and wherein $V_P$ is substantially smaller than the peak voltage.

11. A circuit for charging a capacitor, wherein the capacitor has first lead coupled to an output voltage $V_O$ node, and wherein the capacitor has a second lead coupled to a GND node, the circuit comprising:
- a rectifier that supplies a rectified voltage signal ($V_R$) onto a $V_R$ node, wherein a ground potential GND is present on the GND node, wherein the rectified voltage signal $V_R$ is a periodic signal that has a peak voltage greater than one hundred volts and has a minimum voltage that is less than five volts; and
- a charging circuit that in a steady state operation mode: 1) decouples the $V_O$ node from the $V_R$ node when $V_R$ is greater than a first predetermined voltage $V_P$ and, 2) supplies a charging current ($I_{CHARGE}$) from the $V_R$ node and onto the $V_O$ node when $V_R$ is less than $V_P$ provided that $V_O$ is less than a second predetermined voltage $V_{O(MAX)}$ and provided that $V_R$ is greater than $V_O$, wherein the charging current $I_{CHARGE}$ has a maximum limit value $I_{MAX}$, and wherein $I_{MAX}$ varies as a function of the output voltage $V_O$.

12. The circuit of claim 11, wherein $I_{MAX}$ varies as a function of the output voltage $V_O$ in that if $V_O$ is greater than a third predetermined voltage $V_{THRESH}$ then $I_{MAX}$ is greater than if $V_O$ is smaller than the third predetermined voltage $V_{THRESH}$.

13. The circuit of claim 11, wherein the maximum limit value $I_{MAX}$ is lower when the charging circuit is operating in an initial power up operation mode when the capacitor is being charged from a fully discharged state but yet still has a voltage substantially less than $V_{O(MAX)}$, and wherein the maximum limit value $I_{MAX}$ is higher when the charging circuit is operating in the steady state operation mode.

14. The circuit of claim 13, wherein the capacitor holds a charge of approximately $V_{O(MAX)}$ when the charging circuit is operating in the steady state operation mode, and wherein the capacitor has a voltage substantially lower than $V_{O(MAX)}$ when the charging circuit is operating in the initial power up operation mode.

15. The circuit of claim 11, wherein the charging circuit comprises a field effect transistor through which the charging current flows from the $V_R$ node to the $V_O$ node, wherein the charging circuit decouples the $V_O$ node from the $V_R$ node by making the field effect transistor nonconductive, and wherein the charging circuit supplies the charging current from the $V_R$ node and onto the $V_O$ node by making the field effect transistor conductive.

16. The circuit of claim 11, wherein the circuit and the capacitor together form a non-isolated AC-to-DC power supply circuit.

17. A circuit for charging a capacitor, wherein a rectifier supplies a rectified and periodic voltage signal $V_R$ onto a $V_R$ node, the circuit comprising:
- a ground GND node;
- an output voltage $V_O$ node adapted to be coupled to the capacitor such that a first lead of the capacitor is coupled to the $V_O$ node and a second lead of the capacitor is coupled to the GND node; and
- means for charging the capacitor such that: 1) in a steady state operation mode the means decouples the $V_O$ node from the $V_R$ node when $V_R$ is greater than a first predetermined voltage $V_P$ and, 2) in the steady state operation mode the means supplies a charging current ($I_{CHARGE}$) from the $V_R$ node and onto the $V_O$ node when $V_R$ is less than $V_P$ provided that an output voltage $V_O$ on the capacitor is less than a second predetermined voltage $V_{O(MAX)}$ and provided that $V_R$ is greater than $V_O$, wherein the charging current $I_{CHARGE}$ has a maximum limit value $I_{MAX}$, and wherein the means controls $I_{MAX}$ to vary as a function of the output voltage $V_O$.

18. The circuit of claim 17, wherein the means controls $I_{MAX}$ to vary as a function of the output voltage $V_O$ in that if $V_O$ is greater than a third predetermined voltage $V_{THRESH}$ then $I_{MAX}$ is greater than if $V_O$ is smaller than the third predetermined voltage $V_{THRESH}$.

19. The circuit of claim 17, wherein the means controls $I_{MAX}$ to vary such that in an initial power up operation mode of the circuit $I_{MAX}$ has a lower value than $I_{MAX}$ has when the circuit is operating in the steady state operation mode.

20. The circuit of claim 17, wherein the rectified voltage signal $V_R$ is a periodic signal that has a peak voltage greater than one hundred volts and has a minimum voltage that is less than five volts, and wherein $V_P$ is a positive voltage that is substantially smaller than the peak voltage.

* * * * *